(No Model.)
H. M. POPE.
VELOCIPEDE.
No. 373,850.　　　　　　　　Patented Nov. 29, 1887.
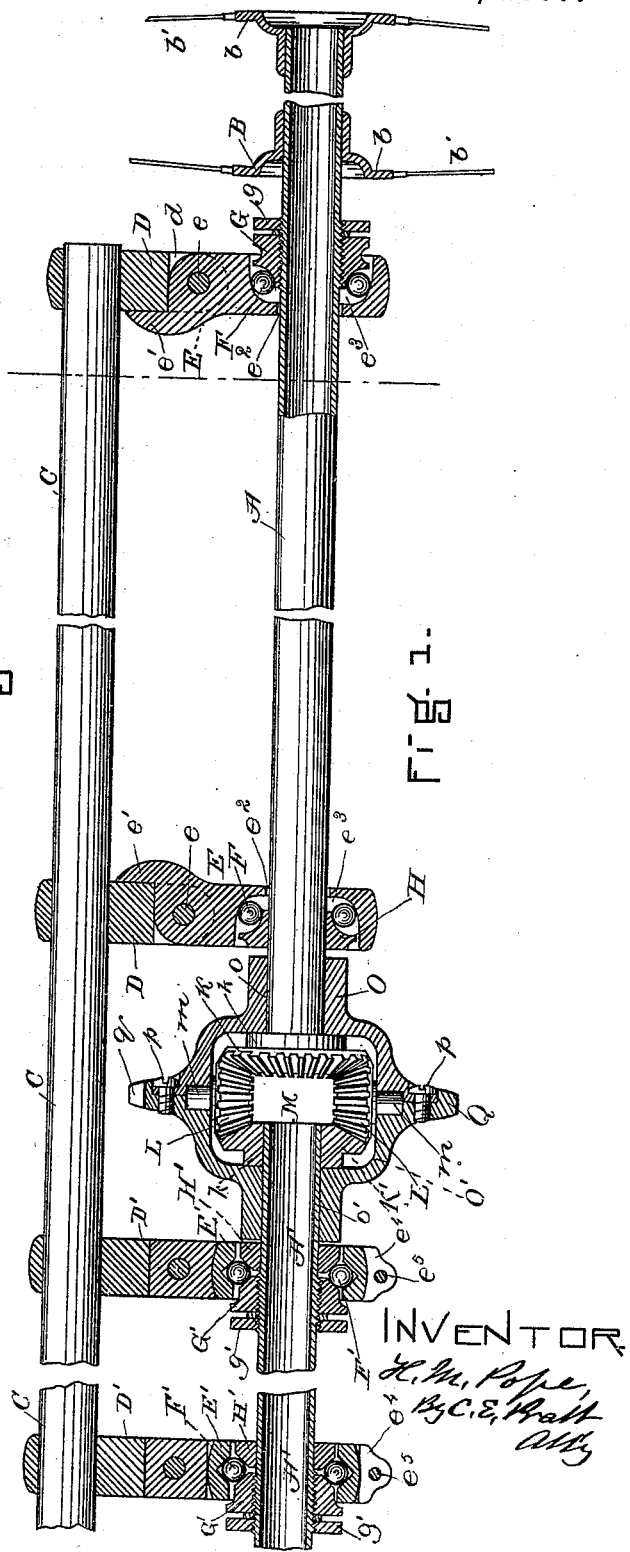
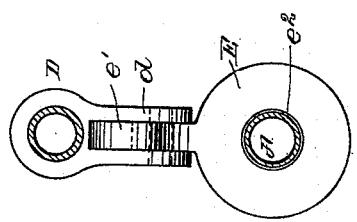
WITNESSES.
Everett S. Benson
Chas E. Walker
INVENTOR.
H. M. Pope,
By C. E. Pratt
Atty

UNITED STATES PATENT OFFICE.

HARRY M. POPE, OF HARTFORD, CONNECTICUT, ASSIGNOR TO THE POPE MANUFACTURING COMPANY, OF PORTLAND, MAINE.

VELOCIPEDE.

SPECIFICATION forming part of Letters Patent No. 373,850, dated November 29, 1887.

Application filed March 3, 1887. Serial No. 229,587. (No model.)

*To all whom it may concern:*

Be it known that I, HARRY M. POPE, of the city and county of Hartford, in the State of Connecticut, have invented certain new and useful Improvements in Velocipedes, of which the following is a specification.

My present improvements relate more particularly to the shaft or axle connecting two driving-wheels abreast and the bearings and frame and balance-gear connected therewith; and my invention consists in certain improvements in parts and combinations, which will be apparent from the following description, taken in connection with the accompanying drawings, in which—

Figure 1 shows, partly in elevation and partly in vertical section, a part of the main frame, bearings, axle, and balance-gear of a velocipede embodying my improvements in one form; and Fig. 2 shows a vertical section of the same on the dotted lines $x\ x$ of Fig. 1, looking toward the right.

A A' are the two corresponding parts of a divided axle, which I prefer to make tubular, as shown, but which may be made solid or in any approved manner, and to which I prefer to connect directly, by brazing or otherwise, at the ends the flanges $b\ b$ of a driving-wheel, B, having the spokes $b'$, though this connection of the wheel may be in any other approved manner, and generally in this description I shall describe what seems to me the most preferable manner without limiting myself to the precise form and arrangements herein shown and described.

C is a tubular part of the main frame of the tricycle, which I prefer to arrange parallel with and above the main two-part axle, and which has the brackets D D or D' D' toward either end from the middle, as shown. To each bracket D, I hinge at $e$ a bearing-piece, E, having a thumb-piece, $e'$, a circular opening or mortise, $e^2$, to freely receive the axle, and a cavity, $e^3$, affording a bearing-surface for anti-friction balls or rollers, which I insert in a circular row of balls, as F. I use two of these brackets D and bearing-pieces E upon either end of the frame-bar C and of the axle-bearing, reversing the position of the bearing-pieces E, as shown at the right hand of Fig. 1, the two bearing-pieces E being alike except in their position, and the circular rows of balls being alike.

On the shaft A, I place a fixed cone, H, secured to the shaft and affording bearing-surface for the balls F to complement one bearing-piece E. At the other bearing-piece E, and to complement it, I place a movable adjusting-cone, G, having also a bearing-surface for the row of balls F, and caused to advance by means of a screw-thread, or in any approved manner, for the adjustment of the bearings, and which may be secured in any position by means of the set-nut $g$. It will be seen that by this construction I secure an adjustment of both bearings and a steady and rigid connection between the axle and the frame-bar and a steady position of the bearing-pieces by means of the thumb-pieces E' E', which resist lateral motion, one of the thumb-pieces E' resisting or acting as a stop against lateral movement to the right and the other against lateral movement to the left, and this construction makes the device easy, mechanical, and effective for manufacture and for assembling and for operation in use, and I prefer to construct the bearings in this manner and to use the same sort of bearings for each part of the divided axle and each end of the frame-bar C; and the advantages of the other parts of my improvement may be secured by the use of bearings constructed more nearly in a manner heretofore used, as shown at the left hand of Fig. 1, in which the brackets D' D', connected with the frame-bar C, are made with larger mortises or openings to inclose the bearing-pieces E' E', which are made in cylindrical form, rounded on their periphery, so as to be held adjustably in position in the brackets, and with split lugs at the bottom, as at $e^4$, and set-screws $e^5$ for setting the bearing-pieces E' E' securely in the brackets, while the two bearings of my other form shown on the right are neither of them complete, but are complementary to each other. In this form shown on the left each bearing is complete—that is to say, each bearing has a fixed cone, H', an adjusting-cone, G', and a set-nut, $g'$, for affording bearing-surfaces to the adjustment of the circular rows of balls F.

To the inner ends of the two-part axle or shaft I fix the bevel-wheels K K', having the shoulders k k, and between them and meshing with them I place the intermediate bevel-wheels, L L, which are free to revolve on trunnions m m, projecting from the trunnion-block M, against which, on either side, the two ends of the divided axle freely abut. These trunnions m m take their bearings in mortises in the shell or balance-gear case O O'. This balance-gear case or shell I make in two complementary parts, O O', which have free bearings on the axle A A' and inner shoulders to bear freely against the shoulders k k of the bevel-wheels fixed to the ends of the axles, and I secure these two parts together by screws p p, or in any other suitable manner, and I form upon the periphery of the part O' a sprocket-wheel, Q, having the sprocket-teeth q to receive a driving-chain.

Now the operation of this device is as follows: The parts being assembled as shown in Fig. 1, and in a tricycle or other velocipede having the usual driving-wheels abreast on the ground and the usual driving mechanism connected by a chain with the sprocket-wheel Q, when power is applied so as to turn the sprocket-wheel about its axial line revolution is imparted by the trunnions and the intermediate gears to the bevel-wheels O O', and so to the two parts of the divided axle A A' equally, if the velocipede be moving in a straight line, and if it be moving in a curved line then the motion is distributed so that the mesne of the motions of the two parts of the axle shall be equal to the angular motion of the sprocket-wheel. It is also obvious that by this arrangement, placing the bearings directly on the divided axle and two on each side of the balance-gear, I am able to have a suitably rigid frame and connections and dispense with the tube or outer sleeve on the shaft A A', and also dispense with the necessity of having one part of the axle continuous through the other part, so as to take a bearing in the loose wheel, and very much simplify the construction of the velocipede.

I claim as new and of my invention—

1. The combination, in a velocipede, of a divided axle and its wheels and frame-bar and bearing-supports connecting it with said divided axle, bevel-wheels, as K K', fixed adjacently at the end of each part of the axle and having shoulders k k and trunnion-block M, with trunnions m m, and intermediate bevel-wheels, as L L, free thereon, and a two-part gear-case, as O O', constructed with free bearing on the axles and with faces presented to the shoulders k k to hold the bevel-wheels and axles in place, bearings for the trunnions and faces to hold the intermediate bevel-wheels in place, a sprocket-wheel, Q, and means, as p p, for securing the two parts of the case and its contents together.

2. The combination of brackets D D, boxes E E, having hinges at e e and stops e' e', an axle-mortise, $e^2 e^2$, and ball-channels $e^3 e^3$, a fixed cone, H, and an adjusting-cone, G, and set-nut g, constructed to operate essentially as set forth.

HARRY M. POPE.

Witnesses:
F. E. BELDEN,
D. J. POST.